Oct. 26, 1965  L. E. MARING  3,213,718
WIRESTRIPPING DEVICE WITH OPENING ADJUSTMENT MEANS
Filed Dec. 26, 1963
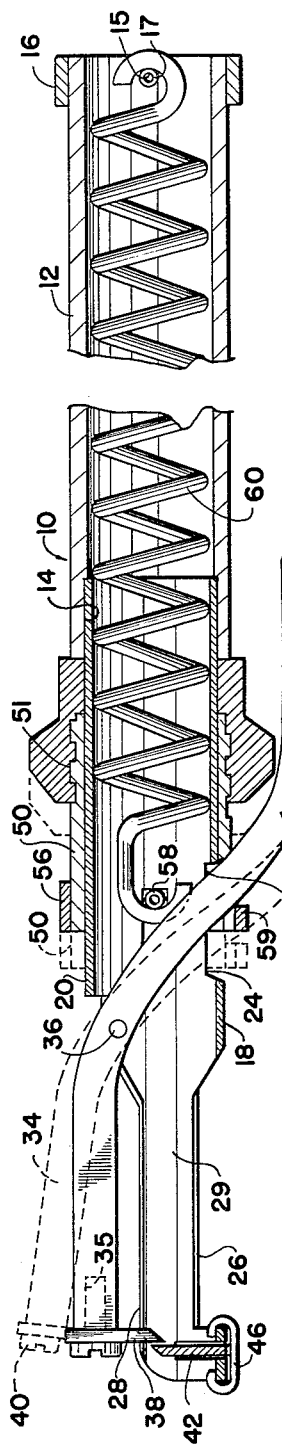
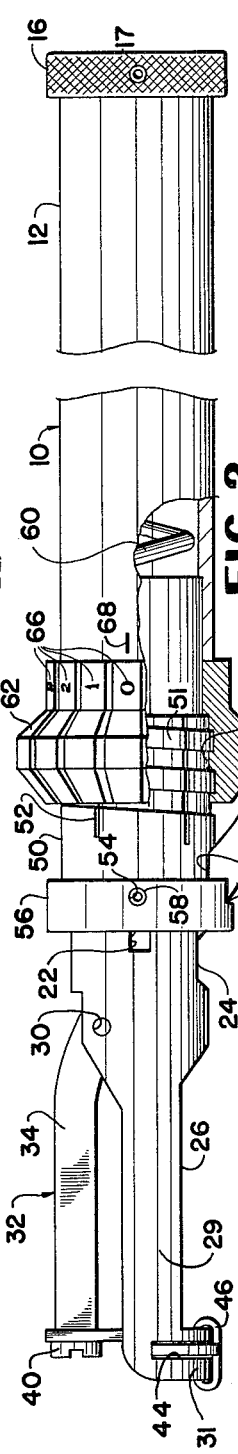
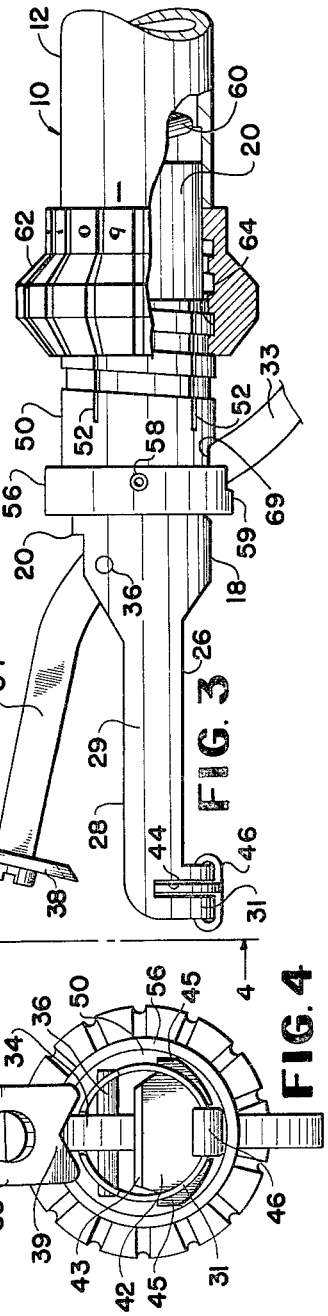
INVENTOR.
LOYD E. MARING
BY *John H. Widdowson*
ATTORNEY

United States Patent Office 3,213,718
Patented Oct. 26, 1965

3,213,718
WIRESTRIPPING DEVICE WITH OPENING ADJUSTMENT MEANS
Loyd E. Maring, 846 N. Dellrose, Wichita, Kans.
Filed Dec. 26, 1963, Ser. No. 333,509
5 Claims. (Cl. 81—9.5)

This invention relates to stripping insulation cover from wire. More specifically this invention relates to a wire stripping apparatus for removing insulation covering from the ends of covered wire. Still more specifically this invention relates to a wire stripping device that has an adjustment means to control the position of the blades to cut the insulation covering and thereby prevent damage to the wire conductor portion. The invention also relates to a wire stripping device that is easy and simple to use, which can be manipulated with one hand, and can be used when wearing gloves.

Wire stripping devices in general are old in the art. However, the wire stripping devices known to the prior art have not been entirely satisfactory for a number of reasons. The prior art wire stripping devices in general are rather complex and difficult to manipulate. Since they are ordinarily quite complex they are relatively expensive to produce and maintain. In view of the complexity of these devices, manipulation and use of these is hampered when the user of same is wearing gloves as is often necessary in cooler weather. Further these devices are often quite bulky and heavy making them inconvenient to carry, use and store.

A most serious disadvantage with prior art wire stripping devices is that they often damage the wire when the insulation covering is removed. The wire is in practice often nicked, or strands cut therefrom if the wire is composed of many strands. Also, these devices are not adapted to handle wire of varying sizes. When wire of varying sizes is encountered by the person using these known devices it is usually necessary to carry a number of wire stripping devices of varying sizes in order to handle the situation.

I have invented a wire stripping device that overcomes all of the aforementioned problems associated with wire stripping devices known to the prior art. My wire stripping device has a handle means and a movable element on the handle means. A cutting means for a wire covering is operatively associated with the movable element. An adjustment means is provided for adjustably limiting and controlling the movement of the cutting means.

A preferred specific embodiment of the wire stripping device of my invention has a hollow handle, a trigger means pivotably mounted on the handle, a blade means affixed to one end of the trigger means and an opposing blade means mounted on the handle. A slidable trigger abutment collar is mounted on the handle and operatively engages the opposite end of the trigger means. A trigger adjustment nut is operatively associated with the trigger abutment collar for adjustably controlling the closed position of the blade means.

The wire stripping device of my invention represents a great advance in the wire working art. The wire stripping device of my invention can be easily adjusted to remove insulation from a wide range of wire sizes. The wire sizes can range from 30 gauge wire to coax or multiconductor cables of up to and over ¼ inch diameter. The insulation adapted to be removed with my device can vary quite widely in thickness and the lower limit including enamel covering. When the wire stripping device of my invention is properly adjusted and used it will not cut or damage the conductor wire. It can be used and manipulated with one hand. It can be made small in size and light in weight, thereby making it easy and convenient to carry and use. It takes up very little room in the pocket of the user or in the tool box. It can be conveniently made in sizes that are slightly larger than a fountain pen that weighs in the neighborhood of three ounces. In cool weather or cool environment the wire stripping device of my invention can be used and manipulated when wearing gloves. It can be used to strip short wires in tight spots, and can be quickly and easily adjusted to accommodate a wide range of wire sizes.

The wire stripping device of my invention is quite light in weight and is yet rugged. It is adapted to be produced from steel tubing and is relatively simple to fabricate and assemble. The cutting blades can be easily removed and sharpened or replaced when they become dull from prolonged use. My wire stripping device is a quality, precision built tool for the auto mechanic, handyman, hobbyist, and those in the telephone, electrical or electronics field.

An object of this invention is to provide a new and improved wire stripping device.

Yet another object of this invention is to provide a new wire stripping device that is rugged and yet light in weight, adapting it to be easily and conveniently carried, used and stored.

Yet another object of this invention is to provide a new wire stripping device that can be easily and quickly adjusted to adapt to be used on a wide size range of covered wire.

Another object of this invention is to provide a wire stripping means that will not in use nick or damage the conductor wire.

Still another object of this invention is to provide a new wire stripping device that can be manipulated and used with one hand, and can be used and adjusted when wearing gloves.

Still another object of this invention is to provide a wire stripping device that can be easily and inexpensively manufactured.

Still another object of the invention is to provide a wire stripping device having removable blades that can be readily removed and sharpened or replaced when they become dull.

Still another object of this invention is to provide a wire stripping device that can be used to handle a wide range of wire size without removing and replacing blades.

Other objects and advantages of the invention will be apparent to those skilled in the art from the disclosure set forth herein.

Drawings of preferred specific embodiments of the invention accompany and are a part hereof, and such are to be understood not to unduly limit the scope of the invention. In the drawings, FIG. 1 is a longitudinal view in cross section of a preferred specific embodiment of the new wire stripping device of my invention.

FIG. 2 is also a longitudinal view of a preferred specific embodiment of my wire stripper device in partial cross section showing further structural details thereof.

FIG. 3 is a fragmentary longitudinal view of my invention illustrating an open position of the trigger element.

FIG. 4 is an end view taken on line 4—4 of FIG. 3.

The following is a discussion and description of the new wire stripping device of my invention made with reference to the drawings, wherein the same reference numerals are used to indicate the same or similar parts and/or structure. The discussion and description are of preferred specific embodiments of the new wire stripper device of my invention, and it is to be understood that such are not to unduly limit the scope of my invention.

Referring now to FIGS. 1 through 4 of the drawings, there is illustrated a preferred specific embodiment of the wire stripping device 10 of my invention. The wire stripping device or tool 10 has a hollow cylindrically shaped handle 12 having an enlarged bore 14 adjacent one end, and aligned transversely extending apertures 15 adjacent the other end. The handle 12 can be formed of any suitable type of material but is preferably made of steel tubing. A reinforcing ring 16 having a knurled exterior surface and aligned transverse apertures is disposed about handle 12 with the apertures 15 in the handle and the apertures in reinforcing ring 16 in alignment. A pin 17 is disposed in the aforementioned aligned apertures to secure the reinforcing ring 16 on the handle 12. A cutter head 18 is affixed to handle 12. The cutter head 18 has a cylindrically shaped length of tubing 20 having one end thereof disposed and secured in the enlarged bore 14 of handle 12. Tubing 20 can be press fitted, welded, soldered, or otherwise suitably secured to handle 12. The length of tubing 20 can be of any suitable material, preferably of steel tubing of a slightly less diameter than the handle 12. The tubing 20 has a set of opposed, aligned, elongated, longitudinally extending, slots 22 in the intermediate portion thereof spaced from the end of handle 12. Tubing 20 also has an elongated longitudinally extending trigger slot 24 disposed in transverse relationship to the set of slots 22, and an elongated, relatively large, longitudinally extending, aperture 26 disposed adjacent the end opposite the end of the tubing secured to the handle. Tubing 20 also has a relatively large semi-cylindrical cut-off 28 opposite aperture 26, and a set of transversely aligned trigger pin apertures 30 spaced from the set of slots 22. The portions of tubing 20 between aperture 26 and cut-out 28 form parallel, longitudinally extending support elements 29 having a transverse semi-cylindrical portion 31 joined to the ends thereof. A trigger 32 is pivotally secured to tubing 20 of cutter head 18. The trigger 32 has a bowed elongated element 34 with a transversely extending aperture in the intermediate portion thereof, and a longitudinally extending threaded aperture 35 on the end thereof. A trigger pin 36 pivotally secures the bowed element 34 to the tubing 20. As shown in FIG. 1 the elongated element 34 of trigger 32 can be pivoted about pin 36 as indicated by the position shown in dotted lines. The bowed element 34 has one end disposed in the trigger slot 24 and protrudes therefrom. A blade 38 having a V-shaped cutting edge 39 is secured to the end of the trigger 32 by a bolt 40 disposed in the threaded aperture 35. An opposing blade means 42 having a cutting edge 43 is secured to the extreme end portion 31 of tubing 20. Portion 31 of tubing 20 has a thin transverse slot 44 adjacent the end thereof with the opposed blade means 42 disposed in slot 44. As indicated in FIG. 4 the blade 42 has protruding ears 45 that abut the bottom surfaces of slot 44 to maintain blade 42 in rigid relationship. A clip means 46 secured to portion 31 of tubing 20 and engaging the portion of blade 42 opposite the cutting edge 43 secures it in locked position.

It can be seen that the blade elements 38 and 42 can be very simply and easily removed from the wire stripping device 10 for either sharpening or replacement. To remove blade 38 it is only necessary to remove bolt 40. To remove the blade 42 only the clip 46 must be removed. It is understood that various other means than hereindescribed can be used to secure the respective blade means to their respective supporting elements. The blades in the wire stripping device 10 can be of any suitable type of material, preferably hardened steel.

A longitudinally slidable trigger abutment collar 50 is disposed about tubing 20 of the cutter head 18 adjacent handle 12. Abutment collar 50 is provided with relatively coarse thread means 51 on a portion of the exterior thereof, and longitudinally extending slits 52. The longitudinal slits 52 adapt the threaded portion of the abutment collar 50 to be forced outwardly against nut or collar 62 to frictionally engage same. This is very advantageous to prevent inadvertent changing of the desired adjustment by bumping during operation or otherwise. Of course, this frictional function can be achieved by any other suitable means, or it can be locked into position, if desired. Also provided in abutment collar 50 is a set of opposed aligned transverse apertures 54. A reinforcing ring 56 is positioned on the end of abutment ring 50 and is provided with two oppositely opposed apertures aligned with the apertures 54. A pin means 58 is disposed in the apertures in reinforcing ring 56, aligned apertures 54 in abutment ring 50, and also secures the abutment collar 50 to the tubing 20 in longitudinal sliding relation thereto. The inner portion 33 of trigger 32 extends through slot 69 in collar 50 and through slot 59 in ring 56. Pin 54 prevents abutment collar 50 and reinforcing ring 56 from turning relative to tubing 20. Reinforcing ring 56 and collar 50 with adjustable nut 62 are slidable together longitudinally which cams arm 32 up and down in use around pivot 30 to separate and engage blades 38 and 42. Tension spring 60 is disposed within the hollow handle 12 and has one end thereof secured to the pin 17 and the other end secured to pin 58. Spring 60 urges the abutment collar 50 in a direction toward the handle. Reinforcing ring 56 contacts the end of bowed element 34 at portion 59 to thereby urge the trigger 32 into closed position, the position illustrated in solid lines in FIG. 1. A trigger adjustment nut 62 is longitudinally slidably disposed about tubing 20. The trigger adjustment nut 62 has a threaded means 64 on the inside surface in operative engagement with the thread means 51 of abutment collar 50. Indicia 66 are provided on the periphery of the adjustment nut 62 to indicate its position relative to the adjustment collar 50. An index marking 68 is provided on handle 12 to cooperate with indicia 66 on nut 62. If desired the indicia 66 can indicate the gauge of the wire that will be appropriate at the setting when the desired gauge is set opposite the index mark 68 or can be arbitrary numerals to serve as a convenient reference. The adjustment nut 62 cooperates with the trigger abutment collar 50 by varying the distance that it can be retracted toward the handle. The nut 62 abuts the end of handle 12 and thereby limits the movement of abutment collar 50 in that direction. By varying the distance that the abutment collar 50 can be retracted, the amount that the trigger 32 is closed can be controlled. By controlling the closing limit of trigger 32 it is possible to allow a sufficient opening between the cutting blades 38 and 42 to insure that the wire conductor being stripped of its insulation is not nicked or cut off by the blades.

In operation the wire stripping device of my invention is grasped in one hand, adjusted to the proper setting by turning adjustment nut 62 to the proper indicia, and the trigger 32 opened to accept the end of a covered wire. The trigger 32 can be opened by merely forcing adjustment nut 62 forwardly with the thumb and a finger of the hand. Upon closing the cutting blades, the wire stripper device is desirably twisted at least one-half turn to either the right or the left and then pulled longitudinally of the wire. If necessary portion 34 of trigger 32 can be pressed inwardly with a finger to assist the closing action exerted by spring 60. The operation of the wire stripping means is to thereby cut the insulation when the device is twisted and thereafter pull the cut portion off the conductor wire maintaining a proper distance between the cutting blades in order to insure that the conductor wire is not nicked or cut off. Also, if desired, the tool of my invention can be adjusted to fully closed position, so that the insulation and wire are severed completely upon closing the tool with the insulated wire between the cutting blades 38 and 42, pressure being applied by portion 34 of trigger 32.

While I have described and illustrated preferred specific embodiments of my invention, it is understood that the wire stripping device and elements thereof disclosed can be made in other forms than hereindescribed or suggested without departing from the spirit of my invention.

I claim:

1. A tool for removing insulation covering from wire comprising, a hollow cylindrically shaped handle having an enlarged bore adjacent one end and aligned transversely extending apertures adjacent the other end, a first reinforcing ring having a knurled exterior surface and aligned transversely extending apertures disposed about said handle adjacent said other end with the apertures in said handle and reinforcing ring in alignment, a first pin disposed in the aligned apertures, a cutter head affixed to said handle comprising, a cylindrically shaped length of tubing having a first end disposed and secured in the enlarged bore of said handle, said tubing having a set of opposed, aligned, elongated, longitudinally extending slots spaced from the end of said handle, an elongated, longitudinally extending trigger slot disposed in transverse relationship to the set of slots, an elongated relatively large longitudinally extending aperture disposed adjacent the second end opposite said first end, a relatively large semi-cylindrical cutout opposite the last-mentioned aperture, and a set of transverse aligned trigger pin apertures spaced from the set of slots, a trigger pivotally secured to said tubing, comprising, a bowed elongated element having a transversely extending aperture in the intermediate portion thereof, and a longitudinally extending threaded aperture on a first end, a trigger pin pivotally securing said bowed elongated element to said tubing, said trigger pin disposed in said aperture in said bowed element and the set of aligned trigger pin apertures in said tubing, said bowed element having the second opposite end disposed in the trigger slot and protruding therefrom, a blade having an aperture and a V-shaped cutting edge, and a bolt means disposed in the threaded aperture and last-mentioned aperture securing said blade means to said first end of said bowed element, an opposing blade means secured to the extreme end of said tubing of said cutter head, said tubing having a thin transverse slot adjacent the end thereof, said opposed blade means snugly disposed in said last-mentioned transverse slot with the cutting edge opposing the cutting edge of said blade means on said bowed element, a clip means securing said opposed blade means in the transverse slot, a longitudinally slidable trigger abutment collar disposed about said tubing of said cutter head adjacent said handle, relatively coarse thread means on a portion of the exterior of said abutment collar, said collar having narrow longitudinally extending slits in the threaded portion thereof, a longitudinally extending slot adjacent the end opposite the threaded portion for receiving said bowed element, and a set of opposed transverse apertures aligned with said set of elongated slots in said tubing of said cutter head, a second reinforcing ring on the end of said abutment collar, a third pin means disposed in the set of apertures of said abutment collar, and set of slots in said tubing securing said second reinforcing ring on said abutment collar, a tension spring disposed within said handle and secured at one end to said third pin means on said abutment collar, and at the opposite end to said first pin disposed in the set of apertures in said opposite end of said handle, a trigger adjustment nut longitudinally slidably disposed about said tubing, threaded means on the inside surface of said adjustment nut in operative engagement with the thread means on said trigger abutment collar, indicia on said adjustment nut arranged along the periphery thereof, and an index marking on said handle arranged to cooperate with said indicia, said tool adapted in use to remove insulation covering from the end of a conductor wire by opening the blades thereof by moving the adjustment nut longitudinally, inserting the end of a covered wire between same, twisting the tool and moving same longitudinally relative to the wire thereby cutting the covering and removing same.

2. A wire stripping device comprising, a hollow cylindrically shaped handle having aligned transversely extending apertures adjacent one end, a first pin means disposed in the aligned set of apertures, a cutter head affixed to said handle on the end opposite said aligned apertures, said cutter head having a cylindrically shaped length of tubing secured to said handle at a first end, said tubing having a set of opposed aligned elongated longitudinally extending slots in the intermediate portion thereof, an elongated longitudinally extending trigger slot disposed in transverse relationship to said set of slots, a relatively large elongated longitudinally extending aperture disposed adjacent the second end opposite the first end, and a relatively large semi-cylindrical cutout adjacent said second end, and a set of transversely extending trigger pin apertures spaced from said set of slots in the intermediate portion thereof, a trigger pivotally secured to said tubing, said trigger having a bowed elongated element having a transversely extending aperture in the intermediate portion thereof, a trigger pin pivotally securing said bowed elongated element to said tubing, said trigger pin disposed in said aperture in said bowed element and said set of triger pin apertures in said tubing, said bowed element having a second opposite end disposed in said trigger slot and protruding therefrom, a blade having a V-shaped cutting edge secured to the end of said bowed element in transversely extending relationship thereto, an opposing blade means secured to the extreme end of said tubing of said cutter head, said tubing having a thin transverse slot adjacent the end thereof, said opposed blade means snugly disposed in said last-mentioned transverse slot with the cutting edge opposing the cutting edge of said blade on said bowed element, means securing said opposed blade means in last-mentioned transverse slot, a longitudinally slidable trigger abutment collar disposed about said tubing of said cutter head adjacent said handle, relatively coarse thread means on a portion of the exterior of said abutment collar, a set of opposed transverse apertures in said abutment collar aligned with the set of elongated slots in said tubing of said cutter head, a third pin means disposed in said set of apertures of said abutment collar and said set of slots in said tubing securing said abutment collar in slidable relation thereto, a tension spring disposed within said handle and secured at one end to said third pin means and at the opposite end to said first pin means, a trigger adjustment nut longitudinally slidably disposed about said tubing, and thread means on the inside surface of said adjustment nut in operative engagement with the thread means on said trigger abutment collar, means associated with said collar and adjustment nut providing for frictional restraint, said wire stripping device adapted in use to remove insulation covering from the end of a conductor wire by moving the adjustment nut longitudinally to open the blades, inserting the end of a covered wire between same, releasing the adjustment nut, twisting the device and moving same longitudinally relative to the wire thereby cutting the covering and removing same.

3. A wire stripping device comprising, a hollow elongated handle, a cutter head portion on one end of said handle, a trigger means pivotally mounted on said cutter head portion, said trigger having an end portion protruding from said cutter head portion, and a blade means having a cutting edge secured to the opposite end of said trigger means, an opposing blade means secured to the extreme end of said cutter head portion, a trigger abutment collar disposed about said cutter head in longitudinal slidable relation thereto, said trigger abutment collar having a portion abutting said trigger adapted to cam same to thereby open said blade means, means to prevent rotation of said trigger abutment collar relative to said cutter head portion, a trigger adjustment nut on said cutter head portion, said trigger adjustment nut having threaded means on the inside surface thereof, thread means on said abutment collar in engagement with said thread means on said adjustment nut, and a tension spring disposed within said hollow handle having one end secured to said handle and the other end thereof secured to said trigger abutment collar, said wire stripping device adapted in use to remove insulation covering from the end of a conductor wire by opening the blades thereof by moving the adjustment nut longitudinally, inserting the end of a covered wire between same, releasing the nut, twisting the tool and moving same longitudinally relative to the wire thereby cutting the covering and removing same.

4. Means to strip a wire comprising, a tool having hand grip means in one end portion and a cutter head on the other end portion, trigger means pivotally mounted on said tool, said trigger means having means in one end portion engageable to operate same and blade means mounted on an opposite end portion, opposing blade means mounted on said cutter head, trigger abutment means mounted on said tool in slidable relationship thereto, said trigger abutment means having a portion abutting said trigger means on said one end portion and adapted to cam said trigger means to thereby open said blade means, trigger adjustment means mounted on said tool, said trigger adjustment means having engagement means, engagement means on said abutment means in engagement with said engagement means on said adjustment means, and resilient means mounted on said tool and having one end portion secured thereto in said one end portion of said tool and the other end portion of said resilient means secured to said trigger abutment means, said means to strip wire adapted in use to remove insulation covering from a wire by opening the blades thereof by moving the trigger abutment means, inserting the covered wire between the blades, releasing the trigger abutment means, thereby grasping the insulation covering, and moving the tool longitudinally relative to the wire thereby removing the insulation covering therefrom.

5. The means to strip a wire of claim 4 wherein said adjustment abutment means are movably mounted in engagement relative to each other and constructed and adapted to in operation upon movement therebetween cam said trigger means to engage and separate the blade means.

References Cited by the Examiner
UNITED STATES PATENTS

| | | | |
|---|---|---|---|
| 2,968,096 | 1/61 | Bonito et al. | 81—9.5 |
| 3,130,616 | 4/64 | Miller | 81—9.5 |
| 3,143,013 | 8/64 | Freeman | 81—9.5 |

WILLIAM FELDMAN, *Primary Examiner.*

MILTON S. MEHR, *Examiner.*